United States Patent [19]

Ebert

[11] Patent Number: 5,681,134
[45] Date of Patent: Oct. 28, 1997

[54] DEVICE FOR CUTTING FRUSTOCONICAL PLUGS FROM A BOARD

[75] Inventor: Winfried Ebert, Weibern, Germany

[73] Assignee: Wolfcraft GmbH, Weibern, Germany

[21] Appl. No.: 560,924

[22] Filed: Nov. 20, 1995

[30] Foreign Application Priority Data

Nov. 19, 1994 [DE] Germany .................. 94 18 523 U
Sep. 1, 1995 [DE] Germany .................. 295 14 037 U

[51] Int. Cl.$^6$ ............................................. B23B 51/04
[52] U.S. Cl. .................... 408/205; 144/218; 144/23
[58] Field of Search ........................ 144/20, 23, 218, 144/240; 408/204, 205, 203.5

[56] References Cited

U.S. PATENT DOCUMENTS

| | | | |
|---|---|---|---|
| 2,027,139 | 1/1936 | Abramson et al. | 408/205 |
| 2,978,002 | 4/1961 | Ranson | 408/205 |
| 3,130,763 | 4/1964 | Schlosser et al. | 408/205 |
| 3,387,637 | 6/1968 | Ferguson et al. | 144/23 |
| 4,595,321 | 6/1986 | Van Dalen | 408/205 |
| 5,054,971 | 10/1991 | Kieninger et al. | 408/204 |
| 5,213,456 | 5/1993 | Lee | 408/204 |
| 5,401,125 | 3/1995 | Sevack et al. | 408/204 |

FOREIGN PATENT DOCUMENTS 961288  6/1964  United Kingdom ............ 408/205

*Primary Examiner*—W. Donald Bray
*Attorney, Agent, or Firm*—Antonelli, Terry, Stout & Kraus, LLP.

[57] ABSTRACT

A device for cutting truncated dowels from a board, with a device including a one-piece cutting body shaped as a hollow cylinder and having a concentric clamping shank. The cutting body is provided with only one recess which forms a knife edge, with the recess opening toward a front of a cutting body and merging into a wider dowel ejection opening. The cutting body has an inside annular cutting edge which determines the larger outside diameter of the truncated dowel to be cut and from which the knife edge originates. The inside circumferential surface of the jacket tapers conically toward the clamping shank, and the knife edge is inclined obliquely inwardly in accordance with the conicity of the inside circumferential surface.

41 Claims, 3 Drawing Sheets

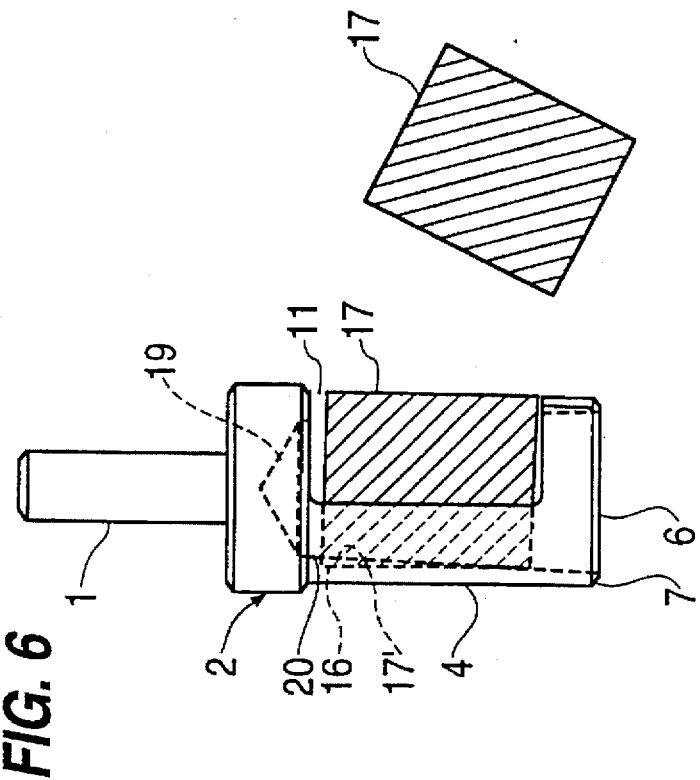
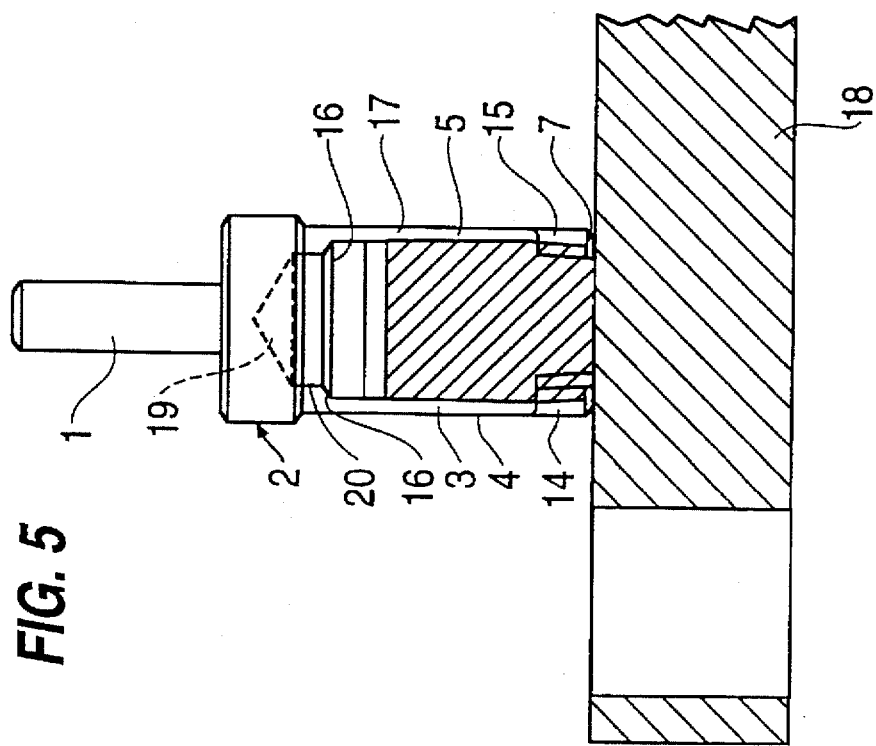

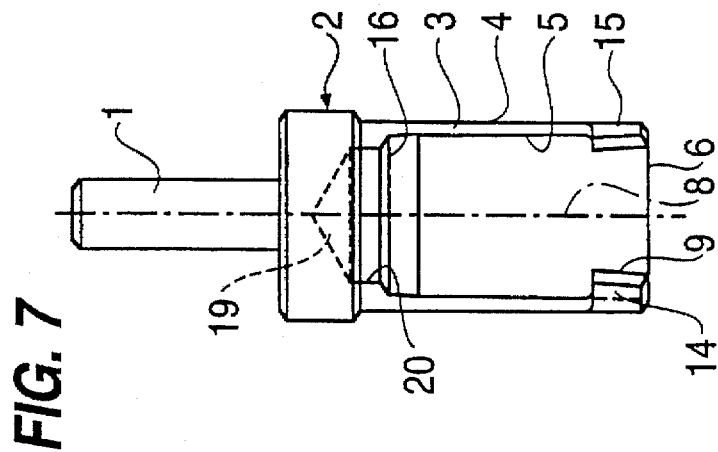
FIG. 7
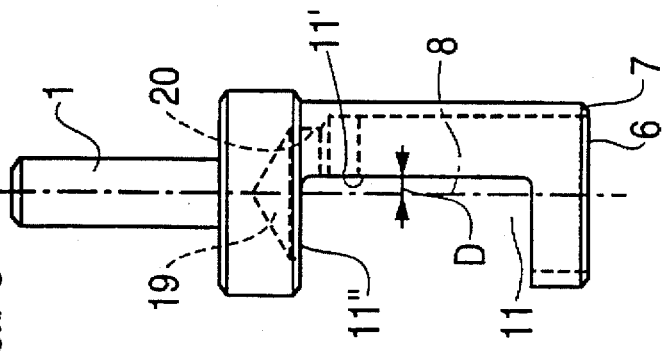
FIG. 8
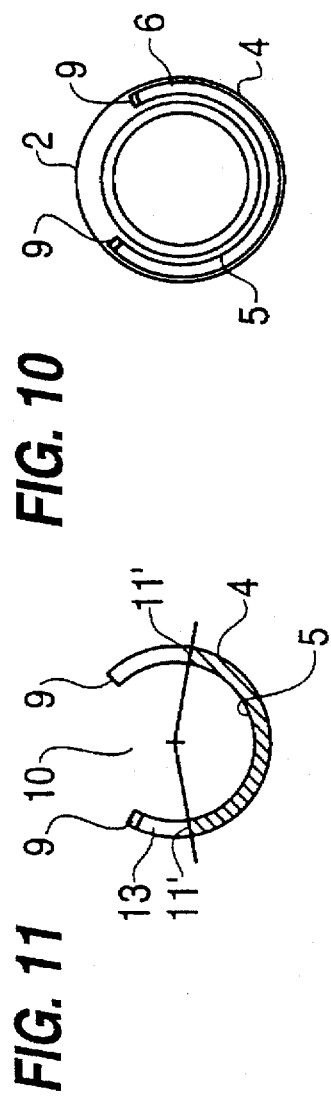
FIG. 10
FIG. 11
FIG. 9

DEVICE FOR CUTTING FRUSTOCONICAL PLUGS FROM A BOARD

BACKGROUND OF THE INVENTION

1. Field of the Invention

The invention relates to a device for cutting frustoconical plugs from a board, the device having a one-piece cutting body having a concentric shank and being a hollow cylinder in basic shape.

2. Description of the Prior Art

In known plug cutters of this type, the cutting body is provided with a plurality of cutting edges and is relatively complex in design, thus making it relatively expensive to manufacture.

SUMMARY OF THE INVENTION

The objective of the invention is to provide a device for cutting frustoconical plugs that can be manufactured economically, the device having very quiet operation and producing precise smooth-walled plugs.

To achieve this objective, a jacket of the cutting body is provided with only one recess, open toward the end and forming a cutting edge, the recess merging with a broader plug expulsion opening, the cutting body has an inner annular cutter that determines a larger outside diameter of the frustoconical plug to be cut, from which the cutting edge originates, the inner circumferential surface of the jacket tapers conically toward the shank, and the cutting edge of the cone formed by the inner circumferential surface is inclined correspondingly diagonally inward.

The cutting device according to the invention can be produced with a high degree of precision by simple turning and grinding work in an economical fashion from a piece of solid material, and can be resharpened at low cost, when necessary by an amateur. The annular cutter which is interrupted only by the relatively narrow recess and otherwise extends completely around the cutter enables the plug cutter to be placed on the board to be cut without the danger of chatter, and an annular groove can be cut in the board using the annular cutter. As the plug cutter cuts deeper, the core which is located inside the annular groove and constantly grows taller is trimmed continuously and conically at its jacket surface, resulting in very smooth-walled jacket surfaces. The axial length of the jacket section with the cutting edge and the recess thus defines the maximum possible length of the plugs to be cut, i.e. the maximum thickness of the board from which plugs can be cut. If the plug sticks in the cutting element after being cut, it can easily be pushed out forward by a finger or a rod. The plug cutter according to the invention is also suitable for cutting a cylindrical hole in a board.

According to another feature of the invention, the cutting edge is inclined diagonally with respect to the axis of the cutting body, namely so that it points toward the shank. This ensures smooth chip removal.

According to one preferred improvement in the invention, the inner jacket surface has a more sharply inclined ramp surface, at least in a partial area, onto which a marginal edge of the plug rides when this plug is displaced in the axial direction by a second plug as it is cut. When the marginal edge of the plug rides up onto this inclined ramp surface, the plug is ejected from the expulsion opening. The ejection of the plug from the expulsion opening and the subsequent falling of the plug out of the opening is assisted by the fact that the axial edges of the expulsion opening are recessed to form an aperture angle larger than 180°. This means that the portion of the internal conical opening surrounded by the jacket of the plug cutter has a smaller cross sectional dimension than the diameter of the plug.

BRIEF DESCRIPTION OF THE DRAWINGS

Embodiments of the invention will be described in greater detail below with reference to the drawings.

FIG. 5 is a second embodiment of the invention placed on a board;

FIG. 6 is a sequential drawing;

FIG. 7 is a front view of the second embodiment;

FIG. 8 shows a side view of the second embodiment;

FIG. 9 shows a rear view of the second embodiment;

FIG. 10 shows a bottom view of the second embodiment; and

FIG. 11 is a section along section XII—XII in FIG. 8.

DESCRIPTION OF THE PREFERRED EMBODIMENTS

Figure 1:
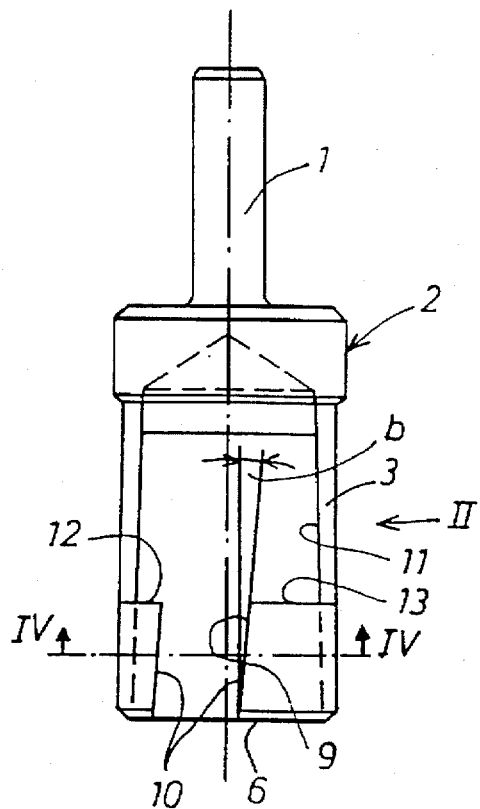
FIG. 1 shows the plug cutter according to the invention in a side view.

The device for cutting frustoconical plugs from a board, herein referred to as a plug cutter, has a one-piece cutting body 2 having a concentric shank 1 and a hollow cylinder. Jacket 3 of cutting body 2 has a precisely cylindrical outer circumferential surface 4 and a conical inner circumferential surface 5 that tapers toward shank 1 as shown in phantom. At its free end, jacket 3 is provided with an annular cutter 6 which forms the lower edge of an inner circumferential surface 5 and whose rear flank 7 is inclined at an angle between 30° and 35°, here approximately 31°, relative to cutting body axis 8.

Figure 2:
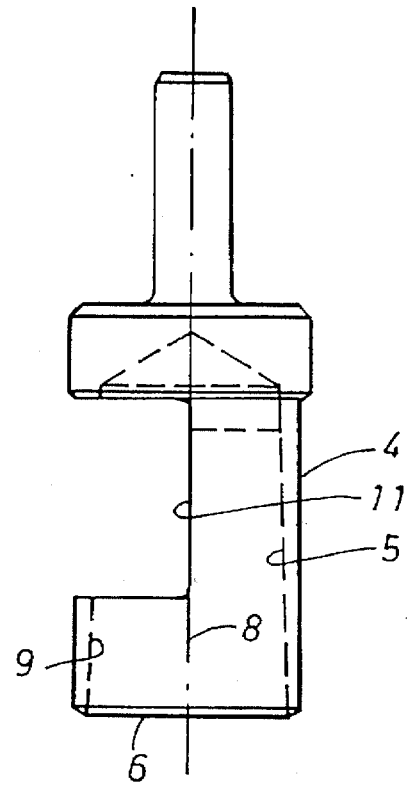
FIG. 2 shows the plug cutter of FIG. 1 from the right, looking in the direction of arrow II.
Figure 3:
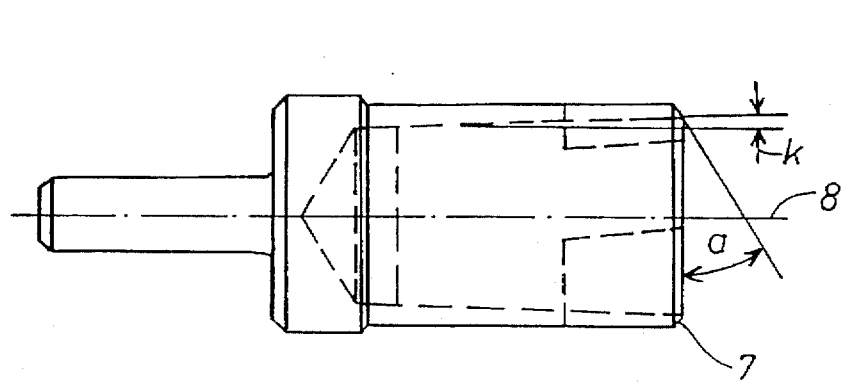
FIG. 3 is a rear view of the plug cutter according to FIG. 1.
Figure 4:
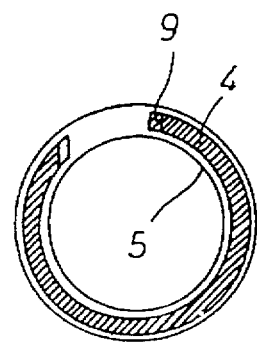
FIG. 4 is a section along line IV—IV in FIG. 1.

The jacket 3 of cutting body 2 is provided with only one recess 10 open at its free end and forming a cutting edge 9. The recess merges with a broader plug expulsion opening 11. The conicity k of inner circumferential surface 5 is approximately 2° to 3° and, in accordance with this conicity, cutting edge 9 gradually approaches cutting body axis 8 in an upward direction as illustrated in the side view in FIG. 2. In the front view in FIG. 1, cutting edge 9 is likewise inclined with respect to a jacket axis line parallel to the cutting body axis, namely pointing toward expulsion opening 11. Slope angle b in the embodiment is approximately 5° but can also be larger, 10° for example.

Recess 10 is disposed centrally with respect to expulsion opening 11 and merges on both side edges 12, 13 running in the circumferential direction with plug expulsion opening 11. The axial length of the portion of jacket 3 that has cutting edge 9 and recess 10 corresponds to the maximum length of the plug to be cut.

During plug cutting, annular cutter 6 determines the larger circumference of the frustoconical plug to be cut, and cuts free a core which is trimmed to a frustum of a cone by the conical slope of cutting edge 9 which begins at annular cutter 6.

The invention provides a self-ejecting plug cutter. For this purpose expulsion opening 11 is designed so that a window opening of more than 180° is produced, beginning at the rotational axis of the plug cutter, so that the cut plug drops out of the window as a result of centrifugal force when it is moved in the axial direction into the window opening during a trimming cut by the plug to be cut next. The material of the plug cutter can be elastic in such fashion that a slight expansion of plug cutter jacket 3 caused by the axial displacement of the plug can be accepted.

In addition, in the second embodiment, the two edges 9 that define recess 10 are separated by an angle to the rotational axis of the plug cutter that is larger than the angular section of a tab 14, 15. In the second embodiment, the angular spacing of the two edges 9 is greater than 45° and preferably 100°.

In the second embodiment shown in FIGS. 5 to 11, a ramp area is provided that is inclined to the central axis. This ramp area is suitable for facilitating the ejection of a cut plug from the expulsion opening. In FIG. 5, a plug cutter is shown with which a first plug 17 has been cut. Plug 17 is stuck in expulsion opening 11. When a second plug is cut with the first plug stuck in expulsion opening 11, the first plug is displaced further in the axial direction. An edge 17' of frustoconical plug 17 underrides a ramp area 16 of the plug so that plug 17 tilts and can drop out of expulsion window 11. This considerably facilitates the use of the plug cutter since the plug need no longer be removed manually from the cutter. The production of a plurality of plugs of the same shape is thus considerably simplified.

As shown in detail in the illustration of the second embodiment, ramp surface 16 is formed by an annular projection directed inward. The surface of the annular projection is inclined conically upward. It extends funnelwise in the axial direction. The slope of surface 16 to axis 8 can be in the range from 30° to 60°. A slope of 45° is preferred.

Annular surface 16 can be made in the form of a closed annular surface. However, it can also be made in the form of an open annular surface and in the latter design the aperture angle of annular surface 16 is made the same size as the aperture angle of expulsion opening 11.

In order to facilitate the ejection of cut plug 17 from expulsion opening 11, the imaginary line connecting the two edges 11' extends in the axial direction of opening 11 and is separated by a distance D running to the axis 8 of the plug cutter. The aperture angle defined by axis 8 and the two axial edges 11' is consequently larger than 180°. In the case of the plug cutter shown in the second embodiment, cutting edge 9 is formed by a tab 14 connected in the axial direction of expulsion opening 11. Preferably two tabs 14, 15 are provided so that a recess 10 is formed between tabs 14, 15 which serves as a chip space when the cutter is operated by a rotary drive.

In order to achieve improved ejection of the plug from expulsion opening 11, the surface 16 which is inclined and open at the marginal side, initially abuts a cylindrical section 20. Thus, a dome 19 in the shape of a hollow cone abuts cylindrical section 20.

In one preferred embodiment, the sloping annular surface 16 opens toward expulsion opening 11 and is axially spaced from circumferential edge 11' of expulsion opening 11.

The following is an identification of the above-described parts of the invention and their corresponding reference numerals in the drawings.

1. Shank
2. Cutting body
3. Jacket
4. Outer circumferential surface
5. Inner circumferential surface
6. Annular cutter
7. Rear flank
8. Axis of 2
9. Cutting edge
10. Recess
11. Expulsion opening
11'. Circumferential marginal edge
12. Edges
13. Edges
14. Tabs
15. Tabs
16. Sloping annular projection
17. Plug
18. Board
19. Frustoconical dome section
20. Cylindrical dome section a) Slope angle of 7
b) Slope of 9
k) Conicity of 5

While the invention has been described in terms of its preferred embodiments, it should be understood that numerous modifications may be made thereto without departing from the spirit and scope thereof. It is intended that all such modifications fall with the scope of the appended claims.

What is claimed is:

1. A device for cutting frustoconical plugs from a board comprising:

a concentric shank, a cutting body extending from the concentric shank including a jacket, the jacket having a recess opening at one end of the jacket, a cutting edge extending axially along the jacket, the recess merging with a plug expulsion opening, an annular cutter determining a maximum diameter of the frustoconical plug to be cut located at an end of the jacket and from which the cutting edge departs, the jacket having an inner circumferential surface tapering conically toward the concentric shank and an aperture angle of the expulsion opening being larger than 180°, and the jacket having a contact surface, tapering conically toward the concentric shank with a tapper greater than the tapper of the inner circumferential surface, for contacting the frustoconical plugs to eject the frustoconical plugs from the expulsion opening.

2. A device according to claim 1 wherein:

the contact surface faces the expulsion opening and is disposed at an end thereof.

3. A device according to claim 2 wherein:

the tapper of the contact surface forms an angle with a longitudinal axis of the device which ranges between 30° and 60°.

4. A device according to claim 2, wherein:

the contact surface is an annular surface opening toward the expulsion opening and is spaced from a circumferential marginal edge of the expulsion opening.

5. A device according to claim 3, wherein:

the contact surface is an annular surface opening toward the expulsion opening and is axially spaced from a circumferential marginal edge of the expulsion opening.

6. A device according to claim 4, wherein:

the annular surface has an annular projection in an axial direction abutting a dome that is hollow in a direction toward the concentric shank.

7. A device according to claim 5, wherein:

the annular surface has an annular projection in an axial direction abutting a dome that is hollow in a direction toward the concentric shank.

8. A device according to claim 2, wherein:

an imaginary line connecting two axial edges of the expulsion opening is located on a remote side of a diagonal passage through an axis of the cutting body to provide the aperture angle of the expulsion opening larger than 180°.

9. A device according to claim 3, wherein:

an imaginary line connecting two axial edges of the expulsion opening is located on a remote side of a diagonal passage through an axis of the cutting body to provide the aperture angle of the expulsion opening larger than 180°.

10. A device according to claim 4, wherein:

an imaginary line connecting two axial edges of the expulsion opening is located on a remote side of a diagonal passage through an axis of the cutting body to provide the aperture angle of the expulsion opening larger than 180°.

11. A device according to claim 5, wherein:

an imaginary line connecting two axial edges of the expulsion opening is located on a remote side of a diagonal passage through an axis of the cutting body to provide the aperture angle of the expulsion opening larger than 180°.

12. A device according to claim 6, wherein:

an imaginary line connecting two axial edges of the expulsion opening is located on a remote side of a diagonal passage through an axis of the cutting body to provide the aperture angle of the expulsion opening larger than 180°.

13. A device according to claim 7, wherein:

an imaginary line connecting two axial edges of the expulsion opening is located on a remote side of a diagonal passage through an axis of the cutting body to provide the aperture angle of the expulsion opening larger than 180°.

14. A device according to claim 1 wherein:

the tapper of the inner circumferential surface forms an angle with a longitudinal axis of the device between 2° and 3°.

15. A device in accordance with claim 2 wherein:

the tapper of the inner circumferential surface forms an angle with a longitudinal axis of the device between 2° and 3°.

16. A device according to claim 3 wherein:

the tapper of the inner circumferential surface forms an angle with a longitudinal axis of the device between 2° and 3°.

17. A device according to claim 4 wherein:

the tapper of the inner circumferential surface forms an angle with a longitudinal axis of the device between 2° and 3°.

18. A device according to claim 5 wherein:

the tapper of the inner circumferential surface forms an angle with a longitudinal axis of the device between 2° and 3°.

19. A device according to claim 6 wherein:

the tapper of the inner circumferential surface forms an angle with a longitudinal axis of the device between 2° and 3°.

20. A device according to claim 7 wherein:

the tapper of the inner circumferential surface forms an angle with a longitudinal axis of the device between 2° and 3°.

21. A device according to claim 8 wherein:

the tapper of the inner circumferential surface forms an angle with a longitudinal axis of the device between 2° and 3°.

22. A device according to claim 9 wherein:

the tapper of the inner circumferential surface forms an angle with a longitudinal axis of the device between 2° and 3°.

23. A device according to claim 10 wherein:

the tapper of the inner circumferential surface forms an angle with a longitudinal axis of the device between 2° and 3°.

24. A device according to claim 11 wherein:

the tapper of the inner circumferential surface forms an angle with a longitudinal axis of the device between 2° and 3°.

25. A device according to claim 12 wherein:

the tapper of the inner circumferential surface forms an angle with a longitudinal axis of the device between 2° and 3°.

26. A device according to claim 1, wherein:

the contact surface is an annular surface opening toward the expulsion opening and is spaced from a circumferential marginal edge of the expulsion opening.

27. A device according to claim 26, wherein:

the annular surface has an annular projection in an axial direction abutting a dome that is hollow in a direction toward the shank.

28. A device according to claim 1, wherein:

an imaginary line connecting two axial edges of the expulsion opening is located on a remote side of a diagonal passage through an axis of the cutting body to provide the aperture angle of the expulsion opening larger than 180°.

29. A device according to claim 26, wherein:

an imaginary line connecting two axial edges of the expulsion opening is located on a remote side of a diagonal passage through an axis of the cutting body to provide the aperture angle of the expulsion opening larger than 180°.

30. A device according to claim 27, wherein:

an imaginary line connecting two axial edges of the expulsion opening is located on a remote side of a diagonal passage through an axis of the cutting body to provide the aperture angle of the expulsion opening larger than 180°.

31. A device according to claim 26 wherein:

the tapper of the inner circumferential surface forms an angle with a longitudinal axis of the device between 2° and 3°.

32. A device according to claim 27 wherein:

the tapper of the inner circumferential surface forms an angle with a longitudinal axis of the device between 2° and 3°.

33. A device according to claim 28 wherein:

the tapper of the inner circumferential surface forms an angle with a longitudinal axis of the device between 2° and 3°.

34. A device for cutting truncated dowels from a board, the device comprising a one-piece cutting body shaped as a hollow cylinder and having a concentric clamping shank, the cutting body comprising:

a jacket provided with only one recess forming a knife edge, the recess being open toward a front of the cutting body and merging into a front of the cutting body and merging into a dowel injection opening having a width greater than a width of the recess; and an inside annular cutting edge for determining a larger outside diameter of a truncated dowel to be cut, the knife edge originating from said annular cutting edge; and wherein an inside circumferential surface of the jacket tapers conically toward the clamping shank; and wherein the knife is inclined obliquely inwardly in accordance with a conicity of the inside circumferential surface.

35. A device according to claim 34, wherein:

the knife edge is inclined obliquely with respect to a longitudinal center axis of the cutting body sloping back in a direction toward the ejection opening.

36. A device according to claim 35, wherein:

the recess is arranged concentrically with respect to the ejection opening and on two sides merges into the ejection opening through edges extending in a circumferential direction of the cutting body.

37. A device according to claim 34, wherein:

an axial length of a section of the jacket where the knife edge and the recess are located on the cutting body corresponds to a maximum length of the dowel to be cut.

38. A device according to claim 37, wherein:

the jacket of the cutting body has a cylindrical outside circumferential surface.

39. A device according to claim 38, wherein:

a rear edge of the annular cutting edge is inclined at an angle of between approximately 30° and 35° with respect to a longitudinal center axis of the cutting body.

40. A device according to claim 36, wherein:

an angle of inclination of the knife edge is approximately 5° to 10°.

41. A device according to claim 35, wherein:

a conicity of the inside circumferential surface is approximately 2° to 3°.

* * * * *